(12) United States Patent
Hirai et al.

(10) Patent No.: US 12,503,583 B2
(45) Date of Patent: Dec. 23, 2025

(54) PERFLUOROPOLYMER, LIQUID COMPOSITION, POLYMER ELECTROLYTE MEMBRANE, MEMBRANE ELECTRODE ASSEMBLY AND POLYMER ELECTROLYTE FUEL CELL

(71) Applicant: AGC Inc., Tokyo (JP)

(72) Inventors: Takeshi Hirai, Tokyo (JP); Daisuke Jomuta, Tokyo (JP); Chikaya Tamitsuji, Tokyo (JP)

(73) Assignee: AGC Inc., Tokyo (JP)

( * ) Notice: Subject to any disclaimer, the term of this patent is extended or adjusted under 35 U.S.C. 154(b) by 984 days.

(21) Appl. No.: 17/333,905

(22) Filed: May 28, 2021

(65) Prior Publication Data

US 2021/0301119 A1 Sep. 30, 2021

Related U.S. Application Data

(63) Continuation of application No. PCT/JP2019/047942, filed on Dec. 6, 2019.

(30) Foreign Application Priority Data

Dec. 7, 2018 (JP) .................................. 2018-230213
Feb. 28, 2019 (JP) .................................. 2019-036658

(51) Int. Cl.
*C08L 27/18* (2006.01)
*H01M 4/86* (2006.01)
(Continued)

(52) U.S. Cl.
CPC ........... *C08L 27/18* (2013.01); *H01M 4/8657* (2013.01); *H01M 8/1004* (2013.01);
(Continued)

(58) Field of Classification Search
None
See application file for complete search history.

(56) References Cited

U.S. PATENT DOCUMENTS 11,840,589 B2 * 12/2023 Hirai .................... H01M 8/1058
2008/0138685 A1 6/2008 Kaneko et al.
(Continued)

FOREIGN PATENT DOCUMENTS

| JP | 2002332376 A | * | 11/2002 | ............ Y02W 30/62 |
| WO | WO 2007/013533 A1 | | 2/2007 | |
| WO | WO 2017/221840 A1 | | 12/2017 | |
| WO | WO 2019/045064 A1 | | 3/2019 | |

OTHER PUBLICATIONS

Mauritz, K.A., et al., "State of Understanding of Nafion", American Chemical Society, Sep. 21, 2004, (Sep. 21, 2004), pp. 4535-4585, XP002516304, Chemical Reviews, US.
(Continued)

*Primary Examiner* — Jessie Walls-Murray
(74) *Attorney, Agent, or Firm* — Element IP, PLC

(57) ABSTRACT

To provide a perfluoropolymer capable of producing an electrolyte membrane excellent in electrical conductivity and mechanical strength under high temperature environment, as well as a liquid composition, a polymer electrolyte membrane, a membrane electrode assembly and a polymer electrolyte fuel cell, obtainable by using the perfluoropolymer. The perfluoropolymer of the present invention contains perfluoromonomer units, does not substantially contain units having a halogen atom other than a fluorine atom, does not substantially contain units having a ring structure, and has acid-type sulfonic acid groups, wherein the perfluoromonomer units contain at least one type of units A selected from the group consisting of perfluoro vinyl ether units and perfluoro allyl ether units; the ion exchange capacity is from
(Continued)

1.4 to 2.5 milliequivalent/gram dry resin; and the storage modulus at 120° C. is at least 60 MPa.

13 Claims, 1 Drawing Sheet

(51) Int. Cl.
*H01M 8/1004* (2016.01)
*H01M 50/426* (2021.01)
(52) U.S. Cl.
CPC ....... *H01M 50/426* (2021.01); *C08L 2203/20* (2013.01); *H01M 2300/0082* (2013.01); *H01M 2300/0085* (2013.01)

(56) References Cited

U.S. PATENT DOCUMENTS

2011/0027688 A1\* 2/2011 Hommura ........... H01M 8/1039
521/38
2019/0131646 A1 5/2019 Saito et al.

OTHER PUBLICATIONS

International Search Report issued Mar. 10, 2020 in PCT/JP2019/047942, filed on Dec. 6, 2019, 2 pages.

\* cited by examiner

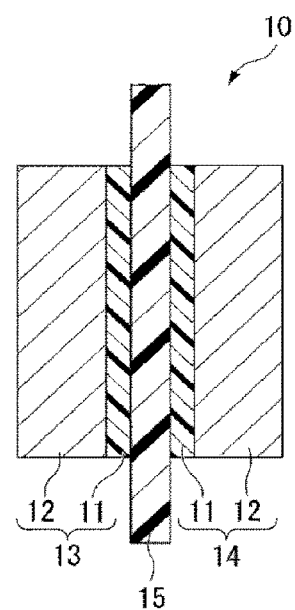

PERFLUOROPOLYMER, LIQUID COMPOSITION, POLYMER ELECTROLYTE MEMBRANE, MEMBRANE ELECTRODE ASSEMBLY AND POLYMER ELECTROLYTE FUEL CELL

TECHNICAL FIELD

The present invention relates to a perfluoropolymer, a liquid composition, a polymer electrolyte membrane, a membrane electrode assembly and a polymer electrolyte fuel cell.

BACKGROUND ART

The polymer electrolyte fuel cell has, for example, a structure in which a membrane electrode assembly is sandwiched between two separators to form a cell, and a plurality of such cells are stacked. The membrane electrode assembly comprises an anode and a cathode each having a catalyst layer, and a polymer electrolyte membrane disposed between the anode and the cathode. The polymer electrolyte membrane is obtainable, for example, by forming a polymer having acid-type sulfonic acid groups into a membrane.

Patent Document 1 discloses a perfluoropolymer having units represented by the following formula (in the formula, Z represents a hydrogen atom or the like) as a polymer having acid-type sulfonic acid groups.

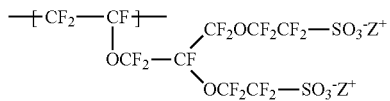

PRIOR ART DOCUMENT

Patent Document

Patent Document 1: WO2017/221840

DISCLOSURE OF INVENTION

Technical Problem

In recent years, a highly conductive polymer electrolyte membrane has been demanded from the viewpoint of improving the power generation efficiency of the polymer electrolyte fuel cell.

Further, since the polymer electrolyte fuel cell operates at a high temperature (for example, 120° C.), there is a demand for a polymer electrolyte membrane excellent in mechanical strength even in a high temperature environment.

When the present inventors have evaluated an electrolyte membrane obtained by using the perfluoropolymer having the above-mentioned units as described in Patent Document 1, they have found that although it is excellent in conductivity, there is room for improvement in mechanical strength in a high temperature environment.

In view of the above circumstances, it is an object of the present invention to provide a perfluoropolymer capable of producing an electrolyte membrane excellent in conductivity and mechanical strength in a high temperature environment, as well as a liquid composition, a polymer electrolyte membrane, a membrane electrode assembly and a polymer electrolyte fuel cell obtainable by using the perfluoropolymer.

Solution to Problem

As a result of diligent studies on the above-mentioned problem, the present inventors have found it possible to produce an electrolyte membrane excellent in conductivity and mechanical strength in a high temperature environment, if a perfluoropolymer is used which contains predetermined repeating units, and of which the ion exchange capacity is within a predetermined range, and the storage modulus at 120° C. is at least 60 MPa, and thus have arrived at the present invention.

That is, the present inventors have found that the above problem can be solved by the following construction.

[1] A perfluoropolymer which is a perfluoropolymer containing perfluoromonomer units, not substantially containing units having a halogen atom other than a fluorine atom, not substantially containing units having a ring structure, and having acid-type sulfonic acid groups, and which is characterized in that the perfluoromonomer units contain at least one type of units A selected from the group consisting of perfluorovinyl ether units and perfluoroallyl ether units, the ion exchange capacity is from 1.4 to 2.5 milliequivalents/gram dry resin, and the storage modulus at 120° C. is at least 60 MPa.

[2] The perfluoropolymer according to [1], of which the ion exchange capacity is from 1.91 to 2.50 milliequivalent/gram dry resin.

[3] The perfluoropolymer according to [1] or [2], of which the hydrogen gas permeation coefficient under the conditions of a temperature of 80° C. and a relative humidity of 10%, is at most $2.5 \times 10^{-9}$ cm$^3$·cm/(s·cm$^2$·cmHg).

[4] The perfluoropolymer according to any one of [1] to [3], which is a perfluoropolymer obtained by converting precursor groups of a precursor polymer in which the acid-type sulfonic acid groups are in the form of the precursor groups, into the acid-type sulfonic acid groups, wherein the TQ value of the precursor polymer is at least 220° C.

[5] The perfluoropolymer according to any one of [1] to [4], wherein the content of units A is from 7 to 45 mol % to all units in the perfluoropolymer.

[6] The perfluoropolymer according to any one of [1] to [5], wherein the perfluoroallyl ether units are units represented by the formula A-1 given later. In the formula A-1 given later, $R^{F1}$ and $R^{F2}$ are each independently a $C_{1-3}$ perfluoroalkylene group.

[7] The perfluoropolymer according to any one of [1] to [6], wherein the perfluoromonomer units further contain tetrafluoroethylene units.

[8] A liquid composition characterized by comprising the perfluoropolymer as defined in any one of [1] to [7] and a liquid medium.

[9] A polymer electrolyte membrane characterized by comprising the perfluoropolymer as defined in any one of [1] to [7].

[10] The polymer electrolyte membrane according to [9], which further contains a reinforcing material.

[11] A membrane electrode assembly characterized by comprising an anode having a catalyst layer containing a catalyst and a polymer having ion exchange groups, a cathode having a catalyst layer containing a catalyst and a polymer having ion exchange groups, and the polymer electrolyte membrane as defined in [9] or [10], disposed between the anode and the cathode.

[12] The membrane electrode assembly according to [11], wherein at least one of the polymer having ion exchange groups contained in the anode and the polymer having ion exchange groups contained in the cathode, is the perfluoropolymer as defined in any one of [1] to [7].

[13] A polymer electrolyte fuel cell characterized by comprising the membrane electrode assembly as defined in [11] or [12].

Advantageous Effects of Invention

According to the present invention, it is possible to provide a perfluoropolymer capable of producing an electrolyte membrane excellent in conductivity and mechanical strength in a high temperature environment, as well as a liquid composition, a polymer electrolyte membrane, a membrane electrode assembly and a polymer electrolyte fuel cell, obtainable by using the perfluoropolymer.

BRIEF DESCRIPTION OF DRAWING

FIG. 1 is a schematic cross-sectional view showing an example of the membrane electrode assembly of the present invention.

DESCRIPTION OF EMBODIMENTS

The following definitions of terms apply throughout the specification and claims unless otherwise noted.

An "ion exchange group" is a group in which at least some of the ions contained in this group can be exchanged with other ions, and, for example, the following sulfonic acid type functional group and carboxylic acid type functional group may be mentioned.

A "sulfonic acid type functional group" is a general term for an acid type sulfonic acid group ($-SO_3H$) and a salt type sulfonic acid group ($-SO_3M^2$, where $M^2$ is a metal ion or a quaternary ammonium cation).

A "carboxylic acid type functional group" is a general term for an acid type carboxylic acid group ($-COOH$) and a salt type carboxylic acid group ($-COOM^1$, where $M^1$ is a metal ion or a quaternary ammonium cation).

"Not substantially containing units" means that the content of the units to all units of the polymer containing said units, is at most 1 mol %.

The productivity index (Rp) value of a polymer indicates the amount (g) of the polymer produced per 100 g of the total amount of monomers charged before and during the polymerization and per hour of the polymerization time.

A "unit" in a polymer means an atomic group derived from one molecule of a monomer, which is formed by polymerization of the monomer. The unit may be an atomic group directly formed by the polymerization reaction, or may be an atomic group in which a part of the atomic group is converted into another structure by processing the polymer obtained by the polymerization reaction. In addition, the structural unit derived from an individual monomer may be described by adding "unit" to the monomer name.

Units represented by the formula A-1 are referred to as units A-1. Units represented by other formulas are also referred to in the same manner.

[Perfluoropolymer]

The perfluoropolymer of the present invention is a perfluoropolymer (hereinafter referred to also as "polymer H") which contains perfluoromonomer units, substantially does not contain units having a halogen atom other than a fluorine atom, substantially does not contain units having a ring structure, and has acid-type sulfonic acid groups, wherein the perfluoromonomer units contain at least one type of units A selected from the group consisting of perfluorovinyl ether units and perfluoroallyl ether units, the ion exchange capacity is from 1.4 to 2.5 milliequivalent/gram dry resin, and the storage modulus at 120° C. is at least 60 MPa.

According to the polymer H, it is possible to produce an electrolyte membrane excellent in conductivity and mechanical strength in a high temperature environment.

The perfluoromonomer units contain units A. As mentioned above, units A mean at least one type of units selected from the group consisting of perfluorovinyl ether units and perfluoroallyl ether units.

The units A may contain one or both of the perfluorovinyl ether units and the perfluoroallyl ether units, but preferably contain the perfluoroallyl ether units from the viewpoint of easy synthesis, and they are particularly preferably perfluoroallyl ether units.

The units A may have an ion exchange group or may not have an ion exchange group, but from such a viewpoint that it becomes easy to adjust the ion exchange capacity of the electrolyte membrane to be in the range as described later, they preferably have an exchange group, more preferably have a sulfonic acid type functional group, particularly preferably have an acid type sulfonic acid group.

When the units A have an ion exchange group, the number of ion exchange groups in one unit is preferably two or more, since it is thereby easy to further increase the ion exchange capacity of the electrolyte membrane, and particularly preferably two, since the synthesis is thereby easy.

The units A contained in the polymer H may be one type or two or more types having different structures.

As the perfluoroallyl ether units, units A-1 are preferred, since the storage modulus of the polymer H at 120° C. is thereby further improved, and it is possible to obtain an electrolyte membrane more excellent in mechanical strength in a high temperature environment.

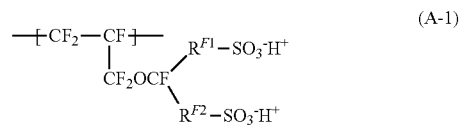
(A-1)

As the perfluorovinyl ether units, units A-2 or units A-3 are preferred, since the storage modulus of the polymer H at 120° C. is thereby further improved, and it is possible to obtain an electrolyte membrane more excellent in mechanical strength in a high temperature environment.

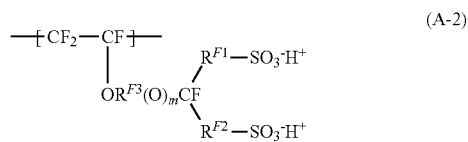
(A-2)

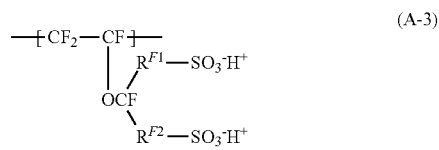
(A-3)

In the formulas A-1 to A-3, $R^{F1}$ and $R^{F2}$ are each independently a $C_{1-3}$ perfluoroalkylene group.

Specific examples of $R^{F1}$ and $R^{F2}$ may be —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$— and —$C(CF_3)(CF_3)$—.

From such a viewpoint that raw material is inexpensive, the production is easy, and it is possible to make the ion exchange capacity of polymer H to be higher, $R^{F1}$ and $RF^2$ are each independently, preferably a $C_1$ or $C_2$ perfluoroalkylene group. In the case where the number of carbon atoms is 2, a straight chain is preferred. Specifically, —$CF_2$—, —$CF_2CF_2$— or —$CF(CF_3)$— is preferred, —$CF_2$— or —$CF_2CF_2$— is more preferred, and —$CF_2$— is particularly preferred.

In the formula A-2, $R^{F3}$ is a 01-6 perfluoroalkylene group. Specific examples of $RF^3$ may be —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$—, —$C(CF_3)(CF_3)$— and —$CF_2CF(CF_3)OCF_2CF(CF_3)$—.

From such a viewpoint that raw material is inexpensive, the production is easy and it is possible to make the ion exchange capacity of polymer H to be higher, $R^{F3}$ is preferably a $C_{1-3}$ perfluoroalkylene group. Specifically, —$CF_2$—, —$CF_2CF_2$— or —$CF_2CF(CF_3)$— is preferred, and —$CF_2CF(CF_3)$— is particularly preferred.

In the formula A-2, m is 0 or 1.

The perfluoromonomer units may contain units other than units A. The units other than units A may be perfluoromonomer units not having an ion exchange group or its precursor group.

Specific examples of the perfluoromonomer units not having an ion exchange group or its precursor group may be tetrafluoroethylene (hereinafter referred to also as "TFE") units and hexafluoropropylene units, and TFE units are preferred from such a viewpoint that the storage modulus of polymer H at 120° C. is more improved, it is possible to obtain an electrolyte membrane more excellent in mechanical strength in a high temperature environment, and a polymer having a higher molecular weight can be obtained, whereby it is possible to obtain an electrolyte membrane more excellent in hot water resistance.

The content of units A is preferably from 7 to 45 mol % to all units in the polymer H.

The lower limit value of the content of units A is preferably 7 mol %, more preferably 14.2 mol %, particularly preferably 14.6 mol %, to all units in the polymer H, from such a viewpoint that it will be easy to adjust the ion exchange capacity of the electrolyte membrane to be in the range described later.

The upper limit value of the content of units A is preferably 45 mol %, more preferably 36 mol %, particularly preferably 22 mol %, from such a viewpoint that the storage modulus of the polymer H at 120° C. is further improved and it is possible to obtain an electrolyte membrane more excellent in mechanical strength in a high temperature environment.

In a case where perfluoromonomer units not having an ion exchange group or its precursor group are contained, the content thereof is preferably from 55 to 93 mol %, more preferably from 64 to 92 mol %, particularly preferably from 78 to 91 mol %, to all units in the polymer H, from such a viewpoint that it will be easy to adjust the ion exchange capacity and the storage modulus at 120° C. to be in the ranges as described later. Such a content is particularly suitable in a case where the perfluoromonomer units are TFE units.

The polymer H does not substantially contain units having a halogen atom other than a fluorine atom (hereinafter referred to also as "units X1"). As a result, the chain transfer reaction is less likely to occur when the monomer is polymerized to produce the polymer H, and the amount of an oligomer generated during the production is small.

Specific examples of units X1 may be chlorotrifluoroethylene units, bromotrifluoroethylene units, iodotrifluoroethylene units, and dichlorodifluoroethylene units.

The polymer H preferably does not contain units X1 (0 mol %).

The polymer H substantially does not contain units having a ring structure (hereinafter referred to also as "units X2"). As a result, the polymer H is suppressed from becoming brittle, and the toughness of the polymer H is increased, whereby the mechanical strength of the electrolyte membrane obtainable by using the polymer H will be excellent.

The ring structure may be an aliphatic hydrocarbon ring, an aliphatic heterocyclic ring, an aromatic hydrocarbon ring, or an aromatic heterocyclic ring. The ring structure may be present in the main chain or in the side chain.

Specific examples of units X2 may be units having a cyclic ether structure as described in Japanese Patent No. 4997968 and Japanese Patent No. 5454592.

The polymer H preferably does not contain units X2 (0 mol %).

The polymer H preferably does not substantially contain units having a crosslinked structure composed of a covalent bond (hereinafter referred to also as "units X3"). This makes it easier for the polymer H to be dissolved or dispersed in a liquid medium, whereby in a case where an electrolyte membrane is formed by using a liquid composition containing the polymer H and the liquid medium, the electrolyte membrane can be thinned.

The crosslinked structure composed of a covalent bond means a structure in which a monomer having a crosslinkable group (for example, a vinyl group, a perfluorovinyl group, etc.) that can be crosslinked by a covalent bond, is polymerized, and then the crosslinkable group is crosslinked by a covalent bond, or a structure obtainable by crosslinking a monomer having a cross-linkable group that can be crosslinked by a covalent bond at the same time as the polymerization reaction.

As a specific example of units X3, units having a structure may be mentioned wherein the compounds of the formulas 8 to 15 (compounds having two crosslinkable groups) as described in JP-A-2001-176524 are polymerized, and then, crosslinkable groups not used in the polymerization are crosslinked by covalent bonds.

It is more preferred that the polymer H does not contain units X3 (0 mol %).

<Physical Properties>

When the ion exchange capacity of the polymer H is high, the conductivity of a electrolyte membrane obtainable by using the polymer H is excellent.

Specifically, the ion exchange capacity of the polymer H is from 1.4 to 2.5 milliequivalent/gram dry resin. The lower limit value of the ion exchange capacity of the polymer H is preferably 1.40 milliequivalent/gram dry resin, more preferably 1.60 milliequivalent/gram dry resin, further preferably 1.91 milliequivalent/gram dry resin, particularly preferably 1.95 milliequivalent/gram dry resin. The upper limit value of the ion exchange capacity of the polymer H is preferably 2.50 milliequivalent/gram dry resin, more preferably 2.48 milliequivalent/gram dry resin, further preferably 2.47 milliequivalent/gram dry resin, particularly preferably 2.46 milliequivalent/gram dry resin. When the ion exchange capacity is at least the lower limit value of the above range, the conductivity of the polymer H becomes high, whereby a sufficient cell output can be obtained at the time when used as a polymer electrolyte membrane for a polymer electrolyte fuel cell. When the ion exchange capacity is at most the upper limit value of the above range, the mechanical strength is excellent at the time when formed into an electrolyte membrane.

The "ion exchange capacity" of the polymer H is obtainable by the method described in Examples given later.

The conductivity of the polymer H at a temperature of 80° C. and a relative humidity of 50% RH is preferably at least 0.06 S/cm, more preferably at least 0.10 S/cm, further preferably at least 0.14 S/cm, particularly preferably at least 0.15 S/cm. When the conductivity is at least the above lower limit value, a sufficient cell output can be obtained when formed into a polymer electrolyte membrane. The higher the conductivity, the better, and the upper limit is not limited.

The "conductivity" of the polymer H is obtainable in the same manner as the method for measuring the conductivity in Examples as described later, except that the measurement target is changed to a membrane made of the polymer H (membrane thickness 25 μm).

When the storage modulus of the polymer H at 120° C. is high, the mechanical strength in a high temperature environment of the electrolyte membrane obtainable by using the polymer H, is excellent.

Specifically, the storage modulus of the polymer H at 120° C. is at least 60 MPa, preferably at least 80 MPa, more preferably at least 100 MPa, particularly preferably at least 110 MPa, from such a viewpoint that it is thereby possible to obtain an electrolyte membrane excellent in mechanical strength in a high temperature environment.

The upper limit of the storage modulus of the polymer H at 120° C. is preferably 180 MPa, more preferably 160 MPa, particularly preferably 140 MPa, from such a viewpoint that the conductivity of the polymer H becomes to be higher.

The "storage modulus at 120° C." of the polymer H is obtainable in the same manner as the method for measuring the storage modulus in Examples as described later, except that the measurement target is changed to a membrane made of the polymer H (membrane thickness: 50 μm).

The softening temperature of the polymer H is preferably from 140 to 170° C., more preferably from 143 to 160° C., particularly preferably from 145 to 155° C. When it is at least the lower limit value, it is possible to obtain an electrolyte membrane more excellent in mechanical strength in a high temperature environment.

The "softening temperature" of the polymer H is obtainable in the same manner as the method for measuring the softening temperature in Examples as described later, except that the measurement target is changed to a membrane made of the polymer H (membrane thickness: 50 μm).

The hydrogen gas permeation coefficient of the polymer H under the conditions of a temperature of 80° C. and a relative humidity of 10%, is preferably at most $2.5 \times 10^{-9}$ cm$^3$·cm/(s·cm$^2$·cmHg), more preferably at most $2.2 \times 10^{-9}$ cm$^3$·cm/(s·cm$^2$·cmHg), further preferably at most $2.0 \times 10^{-9}$ cm$^3$·cm/(s·cm$^2$·cmHg), particularly preferably at most $1.8 \times 10^{-9}$ cm$^3$·cm/(s·cm$^2$·cmHg), from such a viewpoint that the polymer H is thereby excellent in hydrogen gas barrier properties.

The hydrogen gas permeation coefficient of the polymer H under the conditions of a temperature of 80° C. and a relative humidity of 10%, is preferably at least $1.0 \times 10^{-12}$ cm$^3$·cm/(s·cm$^2$·cmHg), particularly preferably at least $1.0 \times 10^{-11}$ cm$^3$·cm/(s·cm$^2$·cmHg), from the viewpoint of maintaining the conductivity of the polymer H to be high.

The "hydrogen gas permeation coefficient" of the polymer H is obtainable in the same manner as the method for measuring the hydrogen gas permeation coefficient in Examples as described later, except that the measurement target is changed to a membrane made of the polymer H (membrane thickness 100 μm).

<Method for Producing Polymer H>

An example of the method for producing the polymer H, a method may be mentioned in which precursor groups of a precursor polymer (hereinafter referred to also as "polymer F") wherein acid form sulfonic acid groups in the polymer H are in the form of the precursor groups (specifically groups represented by —SO$_2$F), are converted to acid-type sulfonic acid groups (—SO$_3^-$H$^+$).

As a specific example of the method of converting the groups represented by —SO$_2$F as the precursor groups, to acid-type sulfonic acid groups, a method may be mentioned in which the groups represented by —SO$_2$F in the polymer F are hydrolyzed to salt type sulfonic acid groups, and the salt type sulfonic acid groups are acidified and converted to acid-type sulfonic acid groups.

(Polymer F)

The polymer F is preferably a perfluoropolymer which contains perfluoromonomer units, substantially does not contain units having a halogen atom other than a fluorine atom, substantially does not contain units having a ring structure, and has groups represented by —SO$_2$F.

Further, the polymer F more preferably substantially does not contain units X3, and particularly preferably does not contain units X3 (0 mol %).

The perfluoromonomer units contained in the polymer F preferably contain at least one type of units a selected from the group consisting of perfluorovinyl ether units and perfluoroallyl ether units.

The units a may contain one or both of perfluorovinyl ether units and perfluoroallyl ether units, but it is preferred that they contain perfluoroallyl ether units from such a viewpoint that the synthesis is thereby easy, and it is particularly preferred that they are perfluoroallyl ether units.

Units contained in the units a may have precursor groups for ion exchange groups, or may not have precursor groups for ion exchange groups, but preferably have precursor groups for ion exchange groups, and particularly preferably have precursor groups (specifically groups represented by —SO$_2$F) for sulfonic acid type functional groups.

A specific example of perfluorovinyl ethers units in the units a may be units having acid-type sulfonic acid groups of perfluorovinyl ether units in the above-mentioned units A changed to groups represented by —SO$_2$F.

As the perfluoroallyl ether units in the units a, units a-1 are preferred.

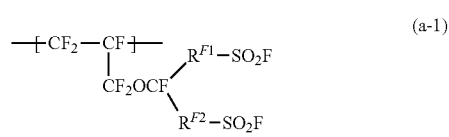

(a-1)

$R^{F1}$ and $R^{F2}$ in the formula a-1 are, respectively, the same as $R^{F1}$ and $R^{F2}$ in the formula A-1.

The perfluoromonomer units in the units a may contain units other than the units a. Specific examples of units other than the units a may be perfluoromonomer units not having an ion exchange group or its precursor group.

Specific examples of the perfluoromonomer units not having an ion exchange group or its precursor group, the units having a ring structure, and the units having a cross-linked structure composed of a covalent bond, are the same as those of the polymer H.

The contents of the respective units in the polymer F are preferably the same as the contents of the respective units in the polymer H.

The TQ value of the polymer F is preferably at least 220° C., more preferably at least 230° C., further preferably at least 240° C., particularly preferably at least 250° C. When the TQ value is at least the above lower limit value, the polymer H having a sufficient molecular weight can be obtained, whereby the mechanical strength of the electrolyte membrane will be more excellent. The TQ value of the polymer F is preferably at most 500° C., more preferably at most 450° C. When the TQ value is at most the above upper limit value, the solubility or dispersibility of the polymer H in the liquid medium is improved, whereby a liquid composition can be easily prepared. The TQ value is an index for the molecular weight of the polymer F.

The "TQ value" of the polymer F is obtainable by the method described in Examples given later.

The polymer F can be produced, for example, by polymerizing a monomer component containing a compound 7 which will be described later, and, as the case requires, TFE, and a monomer other than the compound 7 and TFE.

The polymerization method may, for example, be a bulk polymerization method, a solution polymerization method, a suspension polymerization method, or an emulsion polymerization method. Further, it may be polymerized in liquid or supercritical carbon dioxide.

The polymerization is carried out under the condition that radicals are generated. The method for generating radicals may be a method of irradiating radiation such as ultraviolet rays, γ-rays, electron beams, etc., or a method of adding a radical initiator. The polymerization temperature is preferably at least 80° C. and at most 250° C., more preferably at least 120° C. and at most 230° C., further preferably at least 140° C. and at most 200° C., particularly preferably at least 147° C. and at most 168° C.

In the method for producing a perfluoropolymer of the present invention, the Rp value, which is the amount of a perfluoropolymer produced per 100 g of the total amount of monomers charged before and during the polymerization and per hour of the polymerization time, is preferably at least 1.0, more preferably at least 1.3, further preferably at least 1.6, particularly preferably at least 2.0.

<Use>

The use of the polymer H is not particularly limited, but is preferably used as an electrolyte for a polymer electrolyte membrane, because of its high ion exchange capacity.

Further, the polymer H is also preferably used as a polymer having ion exchange groups, contained in the catalyst layers in a membrane electrode assembly.

[Liquid Composition]

The liquid composition of the present invention contains a polymer H and a liquid medium. The polymer H in the liquid composition may be dispersed in the liquid medium or may be dissolved in the liquid medium.

Since the liquid composition of the present invention contains the polymer H, the electrolyte membrane obtained by using the liquid composition of the present invention is excellent in conductivity and mechanical strength in a high temperature environment.

Specific examples of the liquid medium may be water and an organic solvent. As the liquid medium, only water may be used, only an organic solvent may be used, or a mixed solvent of water and an organic solvent may be used, but a mixed solvent of water and an organic solvent is preferably used.

When water is contained as the liquid medium, the dispersibility or solubility of the polymer H in the liquid medium is likely to be improved. When an organic solvent is contained as the liquid medium, a hardly breakable electrolyte membrane can be easily obtained.

As the organic solvent, an alcohol having from 1 to 4 carbon atoms is preferred, since a hardly breakable electrolyte membrane can thereby be easily obtained.

The alcohol having from 1 to 4 carbon atoms may, for example, be methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol or 3,3,3-trifluoro-1-propanol.

As the organic solvent, one type may be used alone, or two or more types may be used in combination.

When the liquid medium is a mixed solvent of water and an organic solvent, the content of water is preferably from 10 to 99 mass %, particularly preferably from 20 to 99 mass %, to the total mass of the liquid medium.

When the liquid medium is a mixed solvent of water and an organic solvent, the content of the organic solvent is preferably from 1 to 90 mass %, particularly preferably from 1 to 80 mass %.

When the contents of water and the organic solvent are within the above ranges, a polymer electrolyte membrane excellent in dispersibility or solubility in the liquid medium and being hardly breakable can be easily obtained.

The content of the polymer H is preferably from 1 to 50 mass %, particularly preferably from 3 to 30 mass %, to the total mass of the liquid composition. When it is at least the lower limit value in the above range, a thick membrane can be stably obtained at the time of membrane formation. When it is at most the upper limit value in the above range, the viscosity of the liquid composition becomes proper.

The liquid composition may contain at least one type of metal, a metal compound, or a metal ion selected from the group consisting of cerium and manganese in order to further improve the durability of the electrolyte membrane to be made from the liquid composition.

[Polymer Electrolyte Membrane]

The polymer electrolyte membrane of the present invention contains a polymer H.

Since the polymer electrolyte membrane of the present invention contains the polymer H, it is excellent in conductivity and mechanical strength in a high temperature environment.

The membrane thickness of the polymer electrolyte membrane is preferably from 5 to 200 μm, particularly preferably from 10 to 130 μm. When it is at least the lower limit value in the above range, sufficient hydrogen gas barrier properties can be secured. When it is at most the upper limit value in the above range, the membrane resistance can be sufficiently reduced.

The polymer electrolyte membrane may be reinforced with a reinforcing material. Specific examples of the reinforcing material may be porous materials, fibers, woven fabrics, and non-woven fabrics.

The reinforcing material is preferably made of a material selected from the group consisting of polytetrafluoroethylene (hereinafter referred to also as "PTFE"), a tetrafluoroethylene-perfluoroalkyl vinyl ether copolymer (hereinafter referred to also as "PFA"), polyetheretherketone (hereinafter referred to also as "PEEK") and polyphenylene sulfide (hereinafter referred to also as "PPS").

The polymer electrolyte membrane may contain at least one type of metal, a metal compound, or a metal ion selected from the group consisting of cerium and manganese in order to further improve durability. Cerium and manganese decompose hydrogen peroxide or hydroxyl radicals and hydroperoxyl radicals, which are causative substances that cause deterioration of the polymer electrolyte membrane.

The polymer electrolyte membrane may contain silica or a heteropolyacid (e.g. zirconium phosphate, phosphomolybdic acid or phosphotungstic acid) as a water retention agent to prevent drying.

An example of a method for producing a polymer electrolyte membrane may be a method (cast method) in which the above-mentioned liquid composition is applied to the surface of a base film or a catalyst layer and then dried.

As an example of the production method when the polymer electrolyte membrane contains a reinforcing material, there is a method of impregnating the reinforcing material with the above-mentioned liquid composition, followed by drying it.

It is preferred to conduct heat treatment in order to stabilize the polymer electrolyte membrane. The heat treatment temperature is preferably from 130 to 200° C., although it depends on the type of the polymer H. When the heat treatment temperature is at least 130° C., the water content of the polymer H becomes proper. When the heat treatment temperature is at most 200° C., the thermal decomposition of the sulfonic acid groups is suppressed, and the excellent conductivity of the polymer electrolyte membrane can be maintained.

The polymer electrolyte membrane may be treated with a hydrogen peroxide solution, as the case requires.

[Membrane Electrode Assembly]

The membrane electrode assembly of the present invention comprises an anode having a catalyst layer containing a polymer having a catalyst and ion exchange groups, a cathode having a catalyst layer containing a polymer having a catalyst and ion exchange groups, and the above-described polymer electrolyte membrane disposed between the anode and the cathode.

Hereinafter, an example of the membrane electrode assembly of the present invention will be described with reference to the drawing.

FIG. 1 is a schematic cross-sectional view showing an example of the membrane electrode assembly of the present invention. The membrane electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14, in contact with the catalyst layers 11.

Specific examples of the catalyst contained in the catalyst layer 11 may be a supported catalyst in which platinum, a platinum alloy, or a catalyst containing platinum having a core-shell structure, is supported on a carbon carrier, an iridium oxide catalyst, an alloy containing iridium oxide, and a catalyst containing iridium oxide, having a core-shell structure. The carbon carrier may be carbon black powder.

The polymer having ion exchange groups to be contained in the catalyst layer 11 may be a fluoropolymer having ion exchange groups, and it is also preferred to use the above-mentioned polymer H.

When the above-mentioned polymer H is to be used as the polymer having ion exchange groups contained in the catalyst layer 11, at least one among the polymer having ion exchange groups to be contained in the catalyst layer of the anode and the polymer having ion exchange groups to be contained in the catalyst layer of the cathode, may be the polymer H.

The gas diffusion layer 12 has a function to uniformly diffuse the gas in the catalyst layer and a function as a current collector. Specific examples of the gas diffusion layer may be carbon paper, carbon cloth, carbon felt, and a porous body made of titanium (specifically a sintered body of titanium particles or fibers).

The gas diffusion layer may be subjected to water-repellent or hydrophilic treatment with PTFE or the like, or may be hydrophilized with a polymer having ion exchange groups or the like, in order to prevent adhesion of the generated gas.

Although the gas diffusion layer 12 is contained in the membrane electrode assembly in FIG. 1, the gas diffusion layer is an arbitrary member and may not be contained in the membrane electrode assembly.

The polymer electrolyte membrane 15 is a polymer electrolyte membrane containing the above-mentioned polymer H.

The anode 13 and the cathode 14 may have another member other than those described above.

A specific example of another member may be a carbon layer (not shown) provided between the catalyst layer 11 and the gas diffusion layer 12. If the carbon layer is disposed, the gas diffusibility on the surface of the catalyst layer 11 is improved, and the power generation performance of the fuel cell may be further improved.

The carbon layer contains, for example, carbon and a nonionic fluoropolymer. As a specific example of carbon, carbon nanofibers having a fiber diameter of from 1 to 1,000 nm and a fiber length of at most 1,000 μm, are preferred. A specific example of the nonionic fluoropolymer may be PTFE.

As a method for producing a membrane electrode assembly, for example, a method of forming catalyst layers on a polymer electrolyte membrane and further sandwiching the obtained assembly by gas diffusion layers, or a method of forming a catalyst layer on the gas diffusion layer to form electrodes (anode, cathode) and sandwiching a polymer electrolyte membrane by the electrodes.

Further, the method for producing the catalyst layer may be a method in which a coating liquid for forming a catalyst layer is applied to a predetermined position and dried as the case requires. The coating liquid for forming a catalyst layer is a liquid in which a polymer having ion exchange groups and a catalyst are dispersed in a dispersion medium.

[Polymer Electrolyte Fuel Cell]

The polymer electrolyte fuel cell of the present invention contains the above-mentioned membrane electrode assembly.

Since the polymer electrolyte fuel cell of the present invention contains the membrane electrode assembly as described above, it is excellent in power generation performance and durability.

The polymer electrolyte fuel cell of the present invention may have separators having grooves formed as gas flow paths on both sides of the membrane electrode assembly.

Specific examples of the separator may be a metal separator, a carbon separator, a separator made of a material obtained by mixing graphite and a resin, and a separator made of various conductive materials. In a polymer electrolyte fuel cell, power generation is conducted by supplying a gas containing oxygen to the cathode and a gas containing hydrogen to the anode.

The above-mentioned membrane electrode assembly can also be applied to a methanol fuel cell wherein power generation is conducted by supplying methanol to the anode.

EXAMPLES

Hereinafter, the present invention will be described in detail with reference to Examples. Ex. 3-1 to Ex. 3-5 are Examples of the present invention, and Ex. 5-1 to Ex. 5-13 are Comparative Examples. However, the present invention is not limited to these Examples. Further, the blending amounts of the respective components in Tables given later are based on a mass standard.

In the following, "polymer H" is a general term for perfluoropolymers according to Examples, and a precursor polymer thereof is generically referred to as "polymer F". Further, "polymer H'" is a general term for perfluoropolymers according to Comparative Examples, and a precursor polymer thereof is generically referred to as "polymer F'".

[$^1$H-NMR]

$^1$H-NMR was measured under the conditions of frequency: 300.4 MHz and chemical shift standard: tetramethylsilane. Unless otherwise specified, $CD_3CN$ was used as the solvent. The quantification of a product was carried out from the analysis result of $^1$H-NMR and the amount of the internal standard sample (1,3-bis (trifluoromethyl) benzene) added.

[$^{19}$F-NMR]

$^{19}$F-NMR was measured under the conditions of frequency: 282.7 MHz, solvent: $CD_3CN$, and chemical shift standard: $CFCl_3$. The quantification of a product was carried out from the analysis result of $^{19}$F-NMR and the amount of the internal standard sample (1,3-bis(trifluoromethyl) benzene) added.

[$^{13}$C-NMR]

$^{13}$C-NMR was measured under the conditions of frequency: 75.5 MHz and chemical shift standard: tetramethylsilane. Unless otherwise specified, $CD_3CN$ was used as the solvent.

[Yield]

Yield means the yield of the reaction step×the yield of the purification step. The reaction yield means the yield in the reaction step before purifying the target product, which does not include the loss of the purification step.

[Ion Exchange Capacity]

A membrane of the polymer F or polymer F' was vacuum dried at 120° C. for 12 hours. After measuring the mass of the membrane of the polymer after drying, the membrane of the polymer was immersed in a 0.85 mol/g sodium hydroxide solution (solvent: water/methanol=10/90 (mass ratio)) at 60° C. for at least 72 hours, to hydrolyze groups represented by —$SO_2F$. The ion exchange capacity of the polymer F or polymer F' was obtained by back titrating the sodium hydroxide solution after the hydrolysis with 0.1 mol/L hydrochloric acid. In the present specification, the ion exchange capacity of the polymer H or polymer H' is described as being the same as the ion exchange capacity to be measured by using the precursor polymer F or polymer F'.

[Proportions of the Respective Units]

The proportions of the respective units in the polymer F or polymer F' were calculated from the ion exchange capacity of the polymer F or polymer F'.

The proportions of the respective units in the polymer H or polymer H' are the same as the proportions of the corresponding respective units in the polymer F or polymer F'.

[Storage Modulus, Softening Temperature]

With respect to a polymer electrolyte membrane (membrane thickness 50 μm), using a dynamic viscoelasticity measuring device (manufactured by IT Keisoku Seigyo K. K., DVA-225), the dynamic viscoelasticity measurement was carried out under the conditions of sample width: 5.0 mm, gripping space length: 15 mm, measurement frequency: 1 Hz, temperature rise rate: 2° C./min and tension mode. Tan δ (tangent loss) was calculated from the ratio (E"/E') of loss modulus E" to storage modulus E', and a tan δ-temperature curve was prepared. The value obtained by reading the peak temperature between −100 and 200° C. from the tan δ-temperature curve, was taken as the softening temperature of the polymer H or polymer H'. Further, a storage modulus E'-temperature curve was prepared, and the value obtained by reading the storage modulus at 120° C. was taken as the storage modulus of the polymer H or polymer H' at 120° C. Here, the standard size and membrane thickness of the membrane used in the calculation were measured under the conditions of temperature: 23° C. and relative humidity: 50% RH. The polymer electrolyte membrane in an Example is a membrane made of the polymer H or polymer H'. Therefore, the storage modulus and the softening temperature of the polymer electrolyte membrane measured in an Example are the same values as the storage modulus and the softening temperature measured by using the membrane made of the polymer H or polymer H'.

[TQ Value]

Using a flow tester (CFT-500A, manufactured by Shimadzu Corporation) equipped with a nozzle having a length of 1 mm and an inner diameter of 1 mm, the polymer F or polymer F' was melt-extruded while changing the temperature under the condition of an extrusion pressure of 2.94 MPa (gauge pressure). The temperature (TQ value) at which the extrusion amount of the polymer F or polymer F' becomes to be 100 mm$^3$/see was obtained. When the TQ value exceeded 300° C., the TQ value was obtained by extrapolating from the measured value of the extrusion amount at 300° C. or lower. Extrapolation was carried out by a logarithmic approximation of the correlation of extrusion amount with respect to the reciprocal of absolute temperature. The higher the TQ value, the larger the molecular weight of the polymer.

[Conductivity]

A substrate on which 4-terminal electrodes are disposed at 5 mm intervals is brought into close contact with a polymer electrolyte membrane (membrane thickness: 25 μm) having a width of 5 mm, and by a known 4-terminal method, the resistance of the membrane of the polymer H or polymer H' was measured under constant temperature and humidity conditions of a temperature: 80° C. and relative humidity: 50% at AC: 10 kHz and voltage: 1V, whereby the conductivity was calculated. The standard size and membrane thickness of the membrane used in the calculation were measured under the conditions of temperature: 23° C. and relative humidity: 50% RH.

Further, the polymer electrolyte membrane in an Example is a membrane made of the polymer H or polymer H'. Therefore, the conductivity of the polymer electrolyte membrane measured in an Example is the same as the conductivity measured using the membrane made of the polymer H or polymer H'.

[Hydrogen Gas Permeation Coefficient]

The hydrogen gas permeation coefficient of a polymer electrolyte membrane (membrane thickness 100 μm) was measured in accordance with JIS K 7126-2: 2006. As a measuring device, a gas permeability measuring device (GTR-100XFAG, manufactured by GTR TEC Corporation) was used.

A polymer electrolyte membrane having an effective permeation area of 9.62 cm² was kept at 80° C., and on the first surface, hydrogen gas having a relative humidity adjusted to be 10% was permitted to flow at 30 mL/min, and on the second surface, argon gas having a relative humidity adjusted to be 10% was permitted to flow at 30 mL/min. The hydrogen gas permeating to the argon gas was detected by gas chromatography, and the hydrogen gas permeation amount calculated as the volume at 25° C. and 1 atm was obtained. Using the obtained hydrogen gas permeation amount, the permeability of the gas permeated per second per 1 cm² of the membrane area per a pressure difference of 1 cmHg of the permeated gas, was obtained, and the value converted into a membrane having a membrane thickness of 1 cm was taken as the hydrogen gas permeation coefficient. The standard size and membrane thickness of the membrane used in the calculation were measured under the conditions of temperature: 23° C. and relative humidity: 50% RH.

The polymer electrolyte membrane in an Example is a membrane made of the polymer H or polymer H'. Therefore, the hydrogen gas permeation coefficient of the polymer electrolyte membrane measured in an Example is the same value as the hydrogen gas permeation coefficient measured using the membrane made of the polymer H or polymer H'.

Abbreviations

TFE: Tetrafluoroethylene,
CTFE: Chlorotrifluoroethylene,
PSVE: $CF_2=CFOCF_2CF(CF_3)OCF_2CF_2SO_2F$,
P2SVE: $CF_2=CFOCF_2CF(CF_2OCF_2CF_2SO_2F)OCF_2CF_2SO_2F$,
sPSVE: $CF_2=CFOCF_2CF_2SO_2F$,
PSAE: $CF_2=CFCF_2OCF_2CF_2SO_2F$,
P2SAE: $CF_2=CFCF_2OCF_2CF(CF_2OCF_2CF_2SO_2F)OCF_2CF_2SO_2F$,
αC2: $CF_2=CFCF_2CF_2SO_2F$,
PFtBPO: $(CF_3)_3COOC(CF_3)_3$,
PFBPO: $(C_6F_5)C(O)OOC(O)(C_6F_5)$
AIBN: $(CH_3)_2C(CN)N=NC(CH_3)_2(CN)$,
IPP: $(CH_3)_2CHOC(O)OOC(O)OCH(CH_3)_2$,
V-601: $CH_3OC(O)C(CH_3)_2-N=N-C(CH_3)_2C(O)OCH_3$,
tBPO: $(CH_3)_3COOC(CH_3)_3$,
HFC-52-13p: $CF_3(CF_2)_5H$,
HFE-347pc-f: $CF_3CH_2OCF_2CF_2H$,
HCFC-225cb: $CClF_2CF_2CHClF$,
HCFC-141b: $CH_3CCl_2F$.

Ex. 1

Ex. 1-1

Into a 2 L four-necked flask equipped with a stirrer, a condenser, a thermometer and a dropping funnel, 560 g of chlorosulfonic acid was charged under nitrogen gas sealing. The flask was cooled in an ice bath, and while keeping the internal temperature to be at most 20° C., a mixed solution of 139.5 g of compound 1-1 and 478.7 g of dichloromethane was added dropwise over 20 minutes. Heat generation and gas generation were observed during the dropping. After completion of the dropping, the flask was set in an oil bath, and the reaction was conducted for 7 hours while keeping the internal temperature to be from 30 to 40° C. The reaction proceeded with generation of gas, and a white solid was precipitated. After the reaction, the pressure inside the flask was reduced, and dichloromethane was distilled off. A yellowish white solid remained in the flask. The solid was analyzed by ¹H-NMR, whereby it was confirmed that compound 2-1 was formed.

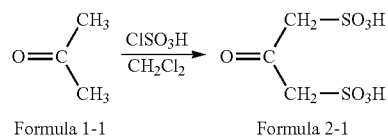

Formula 1-1       Formula 2-1

NMR spectrum of compound 2-1:
¹H-NMR (solvent: $D_2O$): 4.27 ppm (—$CH_2$—, 4H, s).
¹³C-NMR (solvent: $D_2O$): 62.6 ppm (—$CH_2$—), 195.3 ppm (C=O).

Ex. 1-2

Compound 2-1 obtained in Ex. 1-1 was used as it was in the next reaction, without being isolated. 2,049 g of thionyl chloride was added to the flask in Ex. 1-1. The flask was heated to 80° C. and refluxed for 15 hours. As the reaction proceeded, the reflux temperature increased from 52° C. to 72° C. Gas generation was confirmed during the reaction. The point at which compound 2-1 was entirely dissolved and the gas generation stopped, was taken as the reaction end point. When the reaction solution was transferred to a 2 L separable flask and left to cool for 9 hours while sealing the gas phase with nitrogen gas, a dark brown solid was precipitated in the separable flask. Unreacted thionyl chloride was removed by decantation. Toluene was added to wash the precipitated solid, and the toluene was removed by decantation again. Toluene washing was carried out a total of 3 times, and the total amount of toluene used was 1,207 g. The precipitated solid was dried at 25° C. for 71 hours under a nitrogen gas stream. The solid after the drying was recovered and analyzed by ¹H-NMR, whereby it was confirmed that 356.5 g of compound 3-1 having a purity of 96.2% was obtained. The yield based on compound 1-1 was 56.0%.

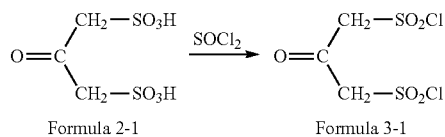

Formula 2-1       Formula 3-1

NMR spectrum of compound 3-1:
¹H-NMR: 5.20 ppm (—$CH_2$—, 4H, s).
¹³C-NMR: 72.3 ppm (—$CH_2$—), 184.6 ppm (C=O).

Ex. 1-3

Into a 1 L four-necked flask equipped with a stirrer, a condenser and a thermometer, 90.0 g of compound 3-1 and 750 mL of acetonitrile were charged under nitrogen gas sealing. The flask was cooled in an ice bath, and 110.3 g of potassium hydrogen fluoride was added with stirring. Heat generation associated with the addition was slight. The ice bath was changed to a water bath, and the reaction was carried out for 62 hours while maintaining the internal temperature to be from 15 to 25° C. Along with the reaction, a fine white solid was formed. The reaction solution was transferred to a pressure filter, and unreacted potassium hydrogen fluoride and the product were separated by filtering. Acetonitrile was added to the filter, and the separated solid was washed until the filtrate became transparent, and the washing solution was recovered. By applying the filtrate and the washing solution to an evaporator, acetonitrile was distilled off. To the solid remaining after drying, 950 mL of toluene was added, and the mixture was heated to 100° C. to dissolve the solid in toluene. The dissolved liquid was filtered by gravity filtration to remove undissolved components. When the filtrate was transferred to a 1 L separable flask and left to cool for 14 hours while sealing the gas phase with nitrogen gas, light brown needle-like crystals were precipitated in the separable flask. The crystals were washed with toluene and dried at 25° C. for 30 hours under a nitrogen gas stream. The dried solid was recovered and analyzed by $^1$H-NMR and $^{19}$F-NMR, whereby it was confirmed that 58.1 g of compound 4-1 having a purity of 97.6% was obtained. The yield based on compound 3-1 was 72.3%.

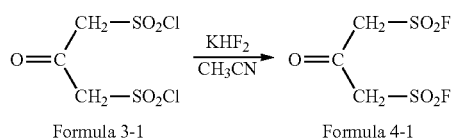

Formula 3-1                Formula 4-1

NMR spectrum of compound 4-1:
$^1$H-NMR: 4.97 ppm (—CH$_2$—, 4H, d, J=3.1 Hz).
$^{19}$F-NMR: 62.4 ppm (—SO$_2$F, 2F, t, J=3.1 Hz).
$^{13}$C-NMR: 60.7 ppm (—CH$_2$—), 184.9 ppm (C=O).

Ex. 1-4

Into a 200 mL nickel autoclave, 9.93 g of compound 4-1 and 89.7 g of acetonitrile were charged. The autoclave was cooled, nitrogen gas was fed at a flow rate of 6.7 L/hr, while maintaining the internal temperature to be from 0 to 5° C., and the reaction solution was bubbled for 1 hour. While maintaining the temperature of the reaction solution to be from 0 to 5° C., a mixed gas of fluorine gas and nitrogen gas (mixing ratio=10.3 mol %/89.7 mol %) was introduced at a flow rate of 6.7 L/hr over 6 hours. Nitrogen gas was fed again at a flow rate of 6.7 L/hr, and the reaction solution was bubbled for 1 hour. 103.2 g of the reaction solution was recovered from the autoclave. The reaction solution was quantitatively analyzed by $^{19}$F-NMR, whereby it was confirmed that compound 5-1 was contained in an amount of 8.4 mass %. The reaction yield based on compound 4-1 became 66%.

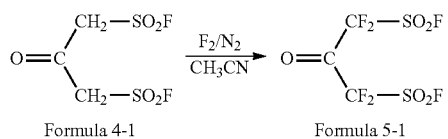

Formula 4-1                Formula 5-1

NMR spectrum of compound 5-1:
$^{19}$F-NMR: −104.1 ppm (—CF$_2$—, 4F, s), 45.8 ppm (—SO$_2$F, 2F, s).

Ex. 1-5

Into a 200 mL nickel autoclave, 19.9 g of compound 4-1 and 85.6 g of acetonitrile were charged. The autoclave was cooled, nitrogen gas was fed at a flow rate of 6.7 L/hr, while maintaining the internal temperature to be from 0 to 5° C., and the reaction solution was bubbled for 1 hour. While maintaining the temperature of the reaction solution to be from 0 to 5° C., a mixed gas of fluorine gas and nitrogen gas (mixing ratio=10.3 mol %/89.7 mol %) was added at a flow rate of 16.4 L/hr over 6.5 hours. Nitrogen gas was fed again at a flow rate of 6.7 L/hr, and the reaction solution was bubbled for 1 hour. 109.6 g of the reaction solution containing compound 5-1 was recovered from the autoclave.

Ex. 1-6

Into a 200 mL nickel autoclave, 20.1 g of compound 4-1 and 80.1 g of acetonitrile were charged. The autoclave was cooled, nitrogen gas was fed at a flow rate of 6.7 L/hr, while maintaining the internal temperature to be from 0 to 5° C., and the reaction solution was bubbled for 1 hour. While maintaining the temperature of the reaction solution to be from 0 to 5° C., a mixed gas of fluorine gas and nitrogen gas (mixing ratio=20.0 mol %/80.0 mol %) was introduced at a flow rate of 8.4 L/hr for 6 hours. Nitrogen gas was fed again at a flow rate of 6.7 L/hr, and the reaction solution was bubbled for 1 hour. 107.1 g of the reaction solution containing compound 5-1 was recovered from the autoclave.

Ex. 1-7

Into a 50 mL four-necked flask equipped with a stirrer, a condenser, a thermometer and a dropping funnel, 1.65 g of potassium fluoride and 7.8 mL of diethylene glycol dimethyl ether (diglyme) were charged. The flask was cooled in an ice bath, stirred, and while maintaining the internal temperature to be from 0 to 10° C., 8.43 g of the reaction solution obtained in Ex. 1-4 was added dropwise using a plastic syringe. Strong heat generation was confirmed, and it took 15 minutes for the dropping. After completion of the dropping, the ice bath was replaced with a water bath, and the reaction was carried out at from 15 to 20° C. for 1 hour. The mixture was cooled again in an ice bath, and 6.56 g of compound 6-1 was added dropwise from the dropping funnel, while maintaining the temperature of the reaction solution to be from 0 to 10° C. After completion of the dropping, the ice bath was replaced with a water bath, and the reaction was conducted at from 20 to 25° C. for 3.5 hours. By-product solid was removed from the reaction solution by suction filtration, and the filtrate was recovered. The filtered residual solid was washed with an appropriate amount of acetonitrile, and the washing liquid was mixed with the filtrate. 37.1 g of the filtrate was quantitatively analyzed by $^{19}$F-NMR, whereby it was confirmed that compound 7-1 was contained in an amount of 2.04 mass %. The reaction yield based on compound 4-1 was 46.6%.

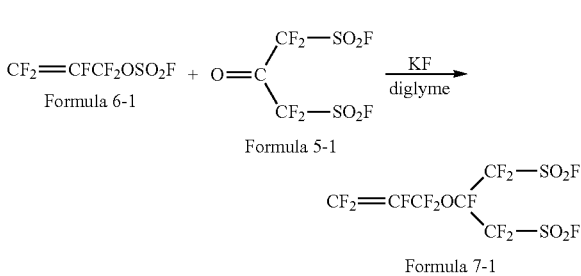

NMR spectrum of compound 7-1:

$^{19}$F-NMR: −191.5 ppm (CF$_2$=CF—, 1F, ddt, J=116, 38, 14 Hz), −133.8 ppm (—O—CF—, 1F, tt, J=21.3, 6.1 Hz), −103.1 ppm (—CF$_2$-SO$_2$F, 4F, m), −101.5 ppm (CF$_2$=CF—, 1F, ddt, J=116, 49, 27 Hz), −87.6 ppm (CF$_2$=CF-, 1F, ddt, J=49, 38, 7 Hz), −67.5 ppm (—CF$_2$-O—, 2F, m), 46.8 ppm (—SO$_2$F, 2F, s).

Ex. 1-8

Into a 500 mL four-necked flask equipped with a stirrer, a condenser, a thermometer and a dropping funnel, 36.6 g of potassium fluoride and 125.6 g of acetonitrile were charged. The flask was cooled in an ice bath and stirred to keep the internal temperature to be from 0 to 10° C., and 79.8 g of the reaction solution obtained in Ex. 1-5 was added dropwise using a plastic dropping funnel. Strong heat generation was confirmed, and it took 23 minutes for the dropping. After completion of the dropping, the ice bath was replaced with a water bath, and the reaction was carried out at from 20 to 30° C. for 5.5 hours. The mixture was cooled again in an ice bath, and 146.0 g of compound 6-1 was added dropwise from the dropping funnel, while maintaining the temperature of the reaction solution to be from 0 to 10° C. After completion of the dropping, the ice bath was replaced with a water bath and the reaction was conducted at from 15 to 25° C. for 16 hours. Suction filtration was carried out in the same manner as in Ex. 1-7, and 412.3 g of the obtained filtrate was quantitatively analyzed by $^{19}$F-NMR, whereby it was confirmed that compound 7-1 was contained in an amount of 3.93 mass %. The reaction yield based on compound 4-1 was 55.9%. The filtrate was distilled under reduced pressure to isolate compound 7-1 as a fraction at a boiling point of 97.2° C./10 kPa. The gas chromatography purity was 98.0%.

Ex. 1-9

Into a 50 mL four-necked flask equipped with a stirrer, a condenser, a thermometer and a dropping funnel, 3.70 g of potassium fluoride and 10.9 g of acetonitrile were charged. The flask was cooled in an ice bath, stirred, and 10.2 g of the reaction solution obtained in Ex. 1-6 was added dropwise using a plastic syringe, while keeping the internal temperature to be from 0 to 10° C. Strong heat generation was confirmed, and it took 8 minutes for the dropping. After completion of the dropping, the ice bath was replaced with a water bath, and the reaction was carried out at from 20 to 30° C. for 3 hours. The mixture was cooled again in an ice bath, and 14.6 g of compound 6-1 was added dropwise from the dropping funnel, while maintaining the temperature of the reaction solution to be from 0 to 10° C. After completion of the dropping, the ice bath was replaced with a water bath, and the reaction was carried out at from 15 to 25° C. for 17 hours. Suction filtration was carried out in the same manner as in Ex. 1-7, and 55.9 g of the obtained filtrate was quantitatively analyzed by $^{19}$F-NMR, whereby it was confirmed that compound 7-1 was contained in an amount of 4.77 mass %. The reaction yield based on compound 4-1 was 69.6%. The reaction yield based on compound 1-1 (reaction yield in the entire monomer synthesis step) was 28.2%.

Ex. 2

Ex. 2-1

Into an autoclave (internal volume 100 mL, made of stainless steel), 104.9 g of compound 7-1 was put, cooled with liquid nitrogen and degassed. The autoclave was heated in an oil bath until the internal temperature reached 125° C. The pressure at this time was −0.09 MPa (gauge pressure). TFE was introduced into the autoclave, and the pressure was adjusted to 0.36 MPa (gauge pressure). The TFE partial pressure became 0.45 MPa. A mixed solution of 21.7 mg of tBPO as a polymerization initiator and 3.05 g of HFC-52-13p was injected into the autoclave. Furthermore, nitrogen gas was introduced from the injection line, and the injecting liquid in the injection line was completely pushed in. By this operation, TFE in the gas phase was diluted, and as a result, the pressure increased to 0.67 MPa (gauge pressure). While maintaining the pressure at 0.67 MPa (gauge pressure), TFE was continuously added to conduct polymerization. When the amount of TFE added reached 7.65 g in 10.5 hours, the inside of the autoclave was cooled to stop the polymerization, and the gas in the system was purged. The reaction solution was diluted with HFC-52-13p, then HFE-347pc-f was added, and the polymer was precipitated and filtered. Then, the operation of stirring the polymer in HFC-52-13p and reprecipitating by HFE-347pc-f was repeated twice. Vacuum drying was conducted at 120° C. to obtain 11.7 g of polymer F-1 as a copolymer of TFE and compound 7-1. The results are shown in Table 1. When HFC-52-13p and HFE-347pc-f used for precipitation were dried to dryness, 0.1 g of an oligomer component was extracted. That is, the oligomer content was 1 mass % or less.

Ex. 2-2 to Ex. 2-7

The respective conditions in Ex. 2-1 were changed as shown in Table 1. However, in Ex. 2-2 to 2-5, instead of injecting the polymerization initiator in a batch at the initial stage, after conducting dilution with nitrogen gas while maintaining the predetermined polymerization temperature, TFE in an amount of the TFE partial pressure shown in Table 1 was introduced to bring the polymerization pressure as shown in Table 1, whereupon a 0.20 mass % solution of tBPO dissolved in compound 7-1 was intermittently added from the injection line at the start of polymerization and every 30 minutes (the total amount of the polymerization initiator and compound 7-1 added is shown in Table 1). Further, in Ex. 2-6, 34.0 g of HFC-52-13p was charged together with compound 7-1, and 2.9 g was used to prepare a mixed solution with a polymerization initiator (PFtBPO). In Ex. 2-7, polymerization was carried out using PFtBPO as a polymerization initiator. Other than that, polymers F-2 to F-7 were obtained in the same manner as in Ex. 2-1. The results are shown in Table 1.

TABLE 1

|  | Ex. 2-1 | Ex. 2-2 | Ex. 2-3 | Ex. 2-4 | Ex. 2-5 | Ex. 2-6 | Ex. 2-7 |
| --- | --- | --- | --- | --- | --- | --- | --- |
| Reactor volume [mL] | 100 | 100 | 100 | 100 | 100 | 100 | 100 |
| Compound 7-1 [g] | 104.9 | 75.2 | 72.6 | 77.3 | 78.1 | 31.5 | 80.0 |
| HFC-52-13p [g] | 3.05 | 0 | 0 | 0 | 0 | 36.9 | 4.23 |

TABLE 1-continued

|  | Ex. 2-1 | Ex. 2-2 | Ex. 2-3 | Ex. 2-4 | Ex. 2-5 | Ex. 2-6 | Ex. 2-7 |
|---|---|---|---|---|---|---|---|
| Type of polymerization initiator | tBPO | tBPO | tBPO | tBPO | tBPO | PFtBPO | PFtBPO |
| Amount of polymerization initiator [mg] | 21.7 | 10.4 | 6.3 | 14.6 | 16.1 | 34.3 | 41.4 |
| Polymerization temperature [° C.] | 125 | 160 | 160 | 150 | 150 | 100 | 100 |
| TFE partial pressure (MPa) | 0.45 | 0.47 | 0.50 | 0.5 | 0.525 | 0.37 | 0.39 |
| Polymerization pressure (MPaG) | 0.67 | 0.75 | 0.80 | 0.78 | 0.82 | 0.56 | 0.56 |
| Continuously added TFE [g] | 7.65 | 7.22 | 6.85 | 11.25 | 13.63 | 4.29 | 5.59 |
| Polymerization time [h] | 10.5 | 3.5 | 8.5 | 9.0 | 10.0 | 8.5 | 6.9 |
| Type of polymer F | F-1 | F-2 | F-3 | F-4 | F-5 | F-6 | F-7 |
| Yield of polymer F [g] | 11.7 | 15.0 | 13.9 | 21.5 | 24.7 | 4.6 | 8.5 |
| Compound 7-1 units [mol %] | 15.1 | 21.3 | 19.8 | 18.2 | 16.9 | 10.0 | 12.4 |
| TFE units [mol %] | 84.9 | 78.7 | 80.2 | 81.8 | 83.1 | 90.0 | 87.6 |
| Ion exchange capacity [milliequivalent/gram dry resin] | 1.99 | 2.46 | 2.35 | 2.24 | 2.14 | 1.49 | 1.74 |
| TQ value [° C.] | 272 | 251 | 310 | 281 | 303 | 268 | 298 |
| Productivity index [g/(100 g · h)] | 1.06 | 2.35 | 2.25 | 3.09 | 3.16 | 1.72 | 1.53 |

Ex. 3

Ex. 3-1 to Ex. 3-5

Using the polymers F-1 to F-7 obtained in Ex. 2, membranes of polymers H-1 to H-7 (membrane thicknesses 25, 50 and 100 μm) were obtained by the following method.

The polymer F was press-molded at a temperature 10° C. higher than the TQ value or 260° C., whichever was lower, and at 4 MPa (gauge pressure) to obtain a membrane of the polymer F. The membrane of the polymer F was immersed in an alkaline aqueous solution A (potassium hydroxide/water=20/80 (mass ratio)) at 80° C. for 16 hours to hydrolyze —SO$_2$—F of the polymer F and convert it to —SO$_3$K. Further, the polymer membrane was immersed in a 3 mol/L hydrochloric acid aqueous solution at 50° C. for 30 minutes and then immersed in ultrapure water at 80° C. for 30 minutes. The cycle of immersion in the aqueous hydrochloric acid solution and immersion in ultrapure water was carried out a total of 5 times to convert —SO$_3$K of the polymer to —SO$_3$H. Washing with ultrapure water was repeated until the pH of the water in which the polymer membrane was immersed became 7. The polymer membrane was sandwiched between filter papers and air-dried to obtain a membrane of the polymer H. Using the obtained membrane of the polymer H as a polymer electrolyte membrane, the above-mentioned various physical property values were measured. The results are shown in Table 2.

In Table 2, "units A-1" means units obtained by converting the groups represented by —SO$_2$F in the compound 7-1 units into —SO$_3$H.

TABLE 2

|  |  | Ex. 3-1 | Ex. 3-2 | Ex. 3-3 | Ex. 3-4 | Ex. 3-5 | Ex. 3-6 | Ex. 3-7 |
|---|---|---|---|---|---|---|---|---|
| Polymer F | Type | F-1 | F-2 | F-3 | F-4 | F-5 | F-6 | F-7 |
|  | TQ value [° C.] | 272 | 251 | 310 | 281 | 303 | 268 | 298 |
| Polymer H | Type | H-1 | H-2 | H-3 | 1-4 | H-5 | H-6 | H-7 |
|  | TFE units [mol %] | 84.9 | 78.7 | 80.2 | 81.8 | 83.1 | 10.0 | 12.4 |
|  | Units A-1 [mol %] | 15.1 | 21.3 | 19.8 | 18.2 | 16.9 | 90.0 | 87.6 |
|  | Ion exchange capacity [milliequivalent/gram dry resin] | 1.99 | 2.46 | 2.35 | 2.24 | 2.14 | 1.49 | 1.74 |
|  | Storage modulus at 120° C. [MPa] | 110.2 | 67.9 | 82.9 | 89.8 | 96.9 | 160.0 | 119.0 |
|  | Conductivity [S/cm] | 0.150 | 0.201 | 0.195 | 0.182 | 0.176 | 0.080 | 0.123 |
|  | Softening temperature [° C.] | 151 | 145 | 147 | 152 | 154 | 151 | 151 |

TABLE 2-continued

|  | Ex. 3-1 | Ex. 3-2 | Ex. 3-3 | Ex. 3-4 | Ex. 3-5 | Ex. 3-6 | Ex. 3-7 |
| --- | --- | --- | --- | --- | --- | --- | --- |
| Hydrogen gas permeation coefficient [cm$^3$ · cm/(s · cm$^2$ · cmHg)] | $2.0 \times 10^{-9}$ | $1.7 \times 10^{-9}$ | $1.8 \times 10^{-9}$ | $1.9 \times 10^{-9}$ | $2.0 \times 10^{-9}$ | $1.2 \times 10^{-10}$ | $1.6 \times 10^{-10}$ |

Ex. 4

Ex. 4-1

Into a Hastelloy autoclave having an internal volume of 230 mL, 123.8 g of PSVE, 35.2 g of HCFC-225cb and 63.6 mg of AIBN were put, cooled with liquid nitrogen and degassed. The temperature was raised to 70° C., TFE was introduced into the system, and the pressure was maintained at 1.14 MPa (gauge pressure). TFE was continuously added so that the pressure became constant at 1.14 MPa (gauge pressure). After 7.9 hours, when the amount of TFE added reached 12.4 g, the autoclave was cooled, and the gas in the system was purged to terminate the reaction. The polymer solution was diluted with HCFC-225cb, and then HCFC-141b was added for precipitation. After washing with HCFC-225cb and HCFC-141b, the mixture was dried to obtain 25.1 g of polymer F'-1 as a copolymer of TFE and PSVE. The results are shown in Table 3.

Ex. 4-2 to Ex. 4-12

Except that the conditions of Ex. 4-1 were changed as shown in Table 3, TFE and PSVE, P2SVE, sPSVE, P2SAE or αC2 were copolymerized in the same manner as in Ex. 4-1 to obtain polymers F'-2 to F'-12. The results are shown in Table 3.

Ex. 4-13

Into an autoclave (internal volume 230 mL, made of stainless steel), 175.0 g of PSAE was put, cooled with liquid nitrogen and degassed. The mixture was heated in an oil bath until the internal temperature reached 120° C., and TFE was introduced into the system to maintain the pressure to be 0.28 MPa (gauge pressure).

Nitrogen gas was introduced from the injection line to dilute TFE in the gas phase. The pressure increased to 0.63 MPa (gauge pressure). Then, a 0.50 mass % solution of PFtBPO dissolved in PSAE was intermittently added from the injection line at the start of polymerization and every 60 minutes (the total amount of the polymerization initiator and PSAE added is shown in Table 3). Polymerization was carried out by continuously adding TFE while maintaining the pressure to be 0.63 MPa (gauge pressure). When the amount of TFE added reached 9.15 g in 5.6 hours, the inside of the autoclave was cooled to stop the polymerization, and the gas in the system was purged. The reaction solution was diluted with HFC-52-13p, and then HFE-347pc-f was added to let the polymer be precipitated and then filtered. Then, the operation of stirring the polymer in HFC-52-13p and reprecipitating by HFE-347pc-f was repeated twice. Vacuum drying was conducted at 120° C. to obtain polymer F'-13 as a copolymer of TFE and PSAE. The results are shown in Table 3.

TABLE 3

|  | Ex. 4-1 | Ex. 4-2 | Ex. 4-3 | Ex. 4-4 | Ex. 4-5 | Ex. 4-6 | Ex. 4-7 |
| --- | --- | --- | --- | --- | --- | --- | --- |
| Reactor volume [mL] | 230 | 230 | 1,000 | 1,000 | 2,500 | 230 | 100 |
| Type of monomer having —SO$_2$F groups | PSVE | PSVE | P2SVE | P2SVE | P2SVE | SPSVE | SPSVE |
| Content of monomer having —SO$_2$F groups [g] | 123.8 | 159.0 | 901.7 | 328.0 | 1,996.0 | 160.2 | 90.0 |
| HFC-225cb [g] | 35.2 | 0.8 | 0 | 415.5 | 20.0 | 1.0 | 1.0 |
| Type of polymerization initiator | AIBN | IPP | IPP | V-601 | V-601 | PP | PFB |
| Amount of polymerization initiator [mg] | 63.6 | 47.9 | 90.7 | 223.7 | 399 | 128.1 | 26.7 |
| Polymerization temperature [° C.] | 70 | 40 | 40 | 70 | 57 | 40 | 24 |
| Pressure before dilution with nitrogen gas [MPa] | — | — | — | — | — | — | — |
| Polymerization pressure [MPaG] | 1.14 | 0.46 | 0.55 | 0.69 | 0.76 | 0.53 | 0.28 |
| Continuously added TFE [g] | 12.4 | 10.5 | 25.0 | 55.0 | 154.6 | 11.2 | 2.79 |
| Polymerization time [h] | 7.9 | 13.6 | 7.0 | 3.7 | 14.5 | 10.0 | 11.0 |
| Type of Polymer F' | F'-1 | F'-2 | F'-3 | F'-4 | F'-5 | F'-6 | F'-7 |
| Yield of polymer F' [g] | 25.1 | 28.1 | 64.8 | 104.1 | 382.2 | 22.5 | 5.0 |
| Monomer units having —SO$_2$F groups [mol %] | 17.8 | 28.7 | 18.4 | 11.9 | 19.6 | 25.3 | 27.5 |
| TFE units [mol %] | 82.2 | 71.3 | 81.6 | 88.1 | 80.4 | 74.7 | 72.5 |
| Ion exchange capacity [milliequivalent/gram dry resin] | 1.10 | 1.44 | 1.87 | 1.46 | 1.93 | 1.74 | 1.84 |
| TQ value [° C.] | 223 | 239 | 296 | 241 | 240 | 255 | 266 |
| Productivity index [g/(100 g · h)] | 2.57 | 1.30 | 1.03 | 8.58 | 1.32 | 1.40 | 0.51 |

TABLE 3-continued

|  | Ex. 4-8 | Ex. 4-9 | Ex. 4-10 | Ex. 4-11 | Ex. 4-12 | Ex. 4-13 |
| --- | --- | --- | --- | --- | --- | --- |
| Reactor volume [mL] | 125 | 125 | 30 | 30 | 125 | 230 |
| Type of monomer having —$SO_2F$ groups | SPSVE | SPSVE | P2SAE | P2SAE | aC2 | PSAE |
| Content of monomer having —$SO_2F$ groups [g] | 90.0 | 85.0 | 24.9 | 25.1 | 63.7 | 182.1 |
| HFC-225cb [g] | 1.0 | 4.0 | 0 | 0 | 0 | 0 |
| Type of polymerization initiator | PFB | V-601 | PFBPO | PFBPO | PFtBPO | PFtBPO |
| Amount of polymerization initiator [mg] | 26.9 | 8.9 | 5.1 | 5.4 | 29.4 | 35.7 |
| Polymerization temperature [° C.] | 24 | 57 | 80 | 80 | 100 | 120 |
| Pressure before dilution with nitrogen gas [MPa] | — | — | — | — | — | 0.28 |
| Polymerization pressure [MPaG] | 0.20 | 1.02 | 0.25 | 0.14 | 0.41 | 0.63 |
| Continuously added TFE [g] | 3.51 | 4.58 | 1.0 | 0.3 | 1.3 | 9.15 |
| Polymerization time [h] | 22.5 | 8.0 | 8.5 | 9.0 | 10.0 | 5.6 |
| Type of Polymer F' | F'-8 | F'-9 | F'-10 | F'-11 | F'-12 | F'-13 |
| Yield of polymer F' [g] | 6.1 | 4.7 | 2.4 | 1.4 | 1.3 | 15.6 |
| Monomer units having —$SO_2F$ groups [mol %] | 33.0 | 19.6 | 10.6 | 12.9 | 11.5 | 20.4 |
| TFE units [mol %] | 67.0 | 80.4 | 89.4 | 87.1 | 88.5 | 79.6 |
| Ion exchange capacity [milliequivalent/gram dry resin] | 2.07 | 1.45 | 1.32 | 1.48 | 1.38 | 1.39 |
| TQ value [° C.] | 231 | 258 | 264 | 191 | 176 | 240 |
| Productivity index [g/(100 g · h)] | 0.30 | 0.69 | 1.14 | 0.63 | 0.21 | 1.53 |

Ex. 5

Ex. 5-1 to Ex. 5-13

Polymers F'-1 to F'-13 were treated in the same manner as in Ex. 3 to obtain membranes of polymers H'-1 to H'-13. Using the obtained membranes of polymers H' as polymer electrolyte membranes, the above-mentioned various physical property values were measured. The results are shown in Table 4.

TABLE 4

|  |  | Ex. 5-1 | Ex. 5-2 | Ex. 5-3 | Ex.5-4 | Ex. 5-5 | Ex. 5-6 | Ex. 5-7 |
| --- | --- | --- | --- | --- | --- | --- | --- | --- |
| Polymer F' | Type | F'-1 | F'-2 | F'-3 | F'-4 | F'-5 | F'-6 | F'-7 |
|  | TQ value [° C.] | 223 | 239 | 296 | 241 | 240 | 255 | 266 |
| Polymer H' | Type | H'-1 | H'-2 | H'-3 | H'-4 | H'-5 | H'-6 | H'-7 |
|  | TFE units [mol %] | 82.2 | 71.3 | 81.6 | 88.1 | 80.4 | 74.7 | 72.5 |
|  | Monomer units having —$SO_2F$ groups [mol %] | 17.8 | 28.7 | 18.4 | 11.9 | 19.6 | 25.3 | 27.5 |
|  | Ion exchange capacity [milliequivalent/gram dry resin] | 1.10 | 1.44 | 1.87 | 1.46 | 1.93 | 1.74 | 1.84 |
|  | Storage modulus at 120° C. [MPa] | 2.7 | 1.8 | 12.5 | 40.8 | 15.9 | 8.9 | 5.6 |
|  | Conductivity [S/cm] | 0.054 | 0.077 | 0.151 | 0.102 | 0.171 | 0.128 | 0.157 |
|  | Softening temperature [° C.] | 107 | 97 | 133 | 138 | 137 | 121 | 121 |
|  | Hydrogen gas permeation coefficient [$cm^3$ · cm/(s · $cm^2$ · cmHg)] | $5.5 \times 10^{-9}$ | $4.7 \times 10^{-9}$ | $3.4 \times 10^{-9}$ | $3.1 \times 10^{-9}$ | $3.5 \times 10^{-9}$ | $3.3 \times 10^{-9}$ | $3.2 \times 10^{-9}$ |
|  |  | Ex. 5-8 | Ex. 5-9 | Ex. 5-10 | Ex.5-11 | Ex. 5-12 | Ex. 5-13 |  |
| Polymer F' | Type | F'-8 | F'-9 | F'-10 | F'-11 | F'-12 | F'-13 |  |
|  | TQ value [° C.] | 231 | 258 | 264 | 191 | 176 | 240 |  |

TABLE 4-continued

| Polymer H' | Type | H'-8 | H'-9 | H'-10 | H'-11 | H'-12 | H'-13 |
|---|---|---|---|---|---|---|---|
| | TFE units [mol %] | 67.0 | 80.4 | 89.4 | 87.1 | 88.5 | 79.6 |
| | Monomer units having —SO$_2$F groups [mol %] | 33.0 | 19.6 | 10.6 | 12.9 | 11.5 | 20.4 |
| | Ion exchange capacity [milliequivalent/gram dry resin] | 2.07 | 1.45 | 1.32 | 1.48 | 1.38 | 1.39 |
| | Storage modulus at 120° C. [MPa] | 4.0 | 19.5 | 38.5 | 27.4 | 329.8 | 5.5 |
| | Conductivity [S/cm] | 0.162 | 0.077 | 0.084 | 0.113 | 0.044 | 0.075 |
| | Softening temperature [° C.] | 115 | 123 | 134 | 138 | 142 | 115 |
| | Hydrogen gas permeation coefficient [cm$^3$ · cm/(s · cm$^2$ · cmHg)] | 2.9 × 10$^{-9}$ | 3.7 × 10$^{-9}$ | — | — | — | 3.3 × 10$^{-9}$ |

As shown in Table 2, the electrolyte membranes (polymer electrolyte membranes) obtained by using the polymers H having an ion exchange capacity in the range of 1.4 to 2.5 milliequivalent/gram dry resin, were excellent in conductivity as compared with the electrolytes obtained by using the polymers H' having an ion exchange capacity out of the above range as shown in Table 4.

Further, as shown in Table 2, since the electrolyte membranes (polymer electrolyte membranes) obtained by using the polymers H have a storage modulus of at least 60 MPa at 120° C., they can be said that the mechanical strength in a high temperature environment is excellent as compared with the electrolytes obtained by using the polymer H' in which the storage modulus at 120° C. is less than the above value as shown in Table 4.

This application is a continuation of PCT Application No. PCT/JP2019/047942, filed on Dec. 6, 2019, which is based upon and claims the benefit of priority from Japanese Patent Application No. 2018-230213 filed on Dec. 7, 2018 and Japanese Patent Application No. 2019-036658 filed on Feb. 28, 2019. The contents of those applications are incorporated herein by reference in their entireties.

REFERENCE SYMBOLS

10: membrane electrode assembly
11: catalyst layer
12: gas diffusion layer
13: anode
14: cathode
15: polymer electrolyte membrane

What is claimed is:

1. A perfluoropolymer:
containing perfluoromonomer units,
not substantially containing units having a halogen atom other than a fluorine atom,
not substantially containing units having a ring structure, and
having acid-type sulfonic acid groups,
wherein:
the perfluoromonomer units contain at least one type of units A selected from the group consisting of perfluorovinyl ether units and perfluoroallyl ether units,
the perfluoroallyl ether units are units represented by formula A-1:

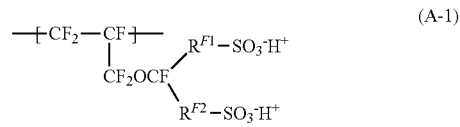
(A-1)

where $R^{F1}$ and $R^{F2}$ are each independently a $C_{1-3}$ perfluoroalkylene group,
the perfluorovinyl ether units are units represented by formula (A-3)

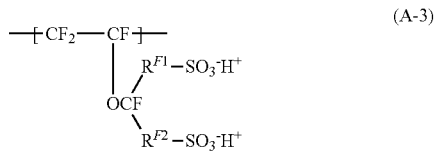
(A-3)

where $R^{F1}$ and $R^{F2}$ are each independently a $C_{1-3}$ perfluoroalkylene group,
an ion exchange capacity of the perfluoropolymer is from 1.49 to 2.5 milliequivalents/gram dry resin, and
a storage modulus of the perfluoropolymer at 120° C. is at least 60 MPa.

2. The perfluoropolymer according to claim 1, wherein the ion exchange capacity is from 1.91 to 2.50 milliequivalent/gram dry resin.

3. The perfluoropolymer according to claim 1, wherein a hydrogen gas permeation coefficient of the perfluoropolymer under conditions of a temperature of 80° C. and a relative humidity of 10%, is at most 2.5×10$^{-9}$ cm$^3$·cm/(s·cm$^2$·cmHg).

4. The perfluoropolymer according to claim 1, which is a perfluoropolymer obtained by converting precursor groups of a precursor polymer in which the acid-type sulfonic acid groups are in the form of the precursor groups, into the acid-type sulfonic acid groups, wherein a TQ value of the precursor polymer is at least 220° C.

5. The perfluoropolymer according to claim 1, wherein a content of units A is from 7 to 45 mol % to all units in the perfluoropolymer.

6. The perfluoropolymer according to claim 1, wherein the perfluoromonomer units further contain tetrafluoroethylene units.

7. A liquid composition comprising the perfluoropolymer as defined in claim 1 and a liquid medium.

8. A polymer electrolyte membrane comprising the perfluoropolymer as defined in claim 1.

9. The polymer electrolyte membrane according to claim 8, which further contains a reinforcing material.

10. A membrane electrode assembly comprising an anode having a catalyst layer containing a catalyst and a polymer having ion exchange groups, a cathode having a catalyst layer containing a catalyst and a polymer having ion exchange groups, and the polymer electrolyte membrane as defined in claim 8, disposed between the anode and the cathode.

11. The membrane electrode assembly according to claim 10, wherein at least one of the polymer having ion exchange groups contained in the anode and the polymer having ion exchange groups contained in the cathode, is a perfluoropolymer:

containing perfluoromonomer units, not substantially containing units having a halogen atom other than a fluorine atom, not substantially containing units having a ring structure, and having acid-type sulfonic acid groups, wherein:

the perfluoromonomer units contain at least one type of units A selected from the group consisting of perfluorovinyl ether units and perfluoroallyl ether units, an ion exchange capacity of the perfluoropolymer is from 1.4 to 2.5 milliequivalents/gram dry resin, and a storage modulus of the perfluoropolymer at 120° C. is at least 60 MPa.

12. A polymer electrolyte fuel cell comprising the membrane electrode assembly as defined in claim 10.

13. The perfluoropolymer according to claim 1, wherein the ion exchange capacity is from 1.60 to 2.5 milliequivalent/gram dry resin.

* * * * *